Patented Nov. 19, 1946

2,411,434

UNITED STATES PATENT OFFICE 2,411,434

PREPARATION OF CHEMICAL COMPOUNDS

Morris Katzman, Chicago, Ill., assignor to The Emulsol Corporation, Chicago, Ill.

No Drawing. Application October 7, 1942, Serial No. 461,227

14 Claims. (Cl. 260—404)

My invention relates to the preparation of reaction products of certain hydroxy-alkyl amines and carboxylic acid acyl halides, particularly higher molecular weight fatty acid acyl chlorides, in order to produce reaction products having good wetting-out properties as well as other highly desirable properties or characteristics.

It has heretofore been suggested, as disclosed, for example, in United States Reissue Patent No. 21,530, to prepare condensation products of hydroxy-alkyl amines with higher molecular weight fatty acids, illustrative examples describing condensing equal molal proportions of monoethanolamine or diethanolamine or triethanolamine with higher molecular weight fatty acids at 150 degrees C. to 175 degrees C. for two to four hours. Instead of using higher molecular weight fatty acids, the patent also suggests that acyl halides thereof may be employed. By so proceeding, condensation products result which are apparently mixtures of esters, amides and mixed ester-amides. The wetting-out and other properties and characteristics of such condensation products, while somewhat variable, depend upon the exact conditions under which the condensations are carried out such as, for example, the time and temperature of condensation and the particular molal ratio of the hydroxy-alkyl amines and the higher molecular weight fatty acid or acyl halide thereof, as the case may be.

By varying the molal ratio of hydroxy-alkyl amine and higher molecular weight fatty acid, so as to employ, for example, two mols of hydroxy-alkyl amine for each mol of higher molecular weight fatty acid, as described in United States Patent No. 2,089,212, condensation products are produced which are stated to have improved wetting-out properties.

I have discovered that if certain hydroxy-alkyl amines, hereinafter described in detail, are reacted with carboxylic acid acyl halides, such as lauroyl chloride or lauroyl bromide, and the reaction is carried out in an aqueous medium, particularly in a dilute aqueous medium, at low temperatures, reaction products are produced which have good wetting-out properties even where the molal ratios are of the order of one mol of hydroxy-alkyl amine to one mol of carboxylic acid acyl halide. In addition, the reaction products have excellent color and good surface-modifying properties in general. Furthermore, the process is exceptionally simple to carry out and the yields are high. So far as I have been able to ascertain, the reaction products which I produce in accordance with my present invention differ not only in composition but also in properties in relation to known condensation products produced from corresponding hydroxy-alkyl amines and carboxylic acids or their acyl halides such as disclosed, for example, in the patents referred to hereinabove.

In order that those skilled in the art may readily and fully understand the manner in which the invention may be practiced, several specific embodiments thereof are set out hereinbelow. It will be understood that these are illustrative and are not to be construed as limitative of the full scope of the invention in any way. Thus, for example, in its broadest aspect the molal ratios of the reacting ingredients and the temperatures and times of reaction are subject to certain variations, within limits, without departing from the principles of the invention as set out hereinabove and in the appended claims.

*Example I*

(a) 10.5 grams (0.1 mol) of diethanolamine were dissolved in 425 cc. of water and the solution was cooled to about 10 degrees C. to 11 degrees C. in an ice-water bath. 10 grams of lauroyl chloride were then added, dropwise and with stirring, and then 100 cc. of a solution of sodium hydroxide were added (said solution being made by dissolving 4 grams of sodium hydroxide in 150 cc. of water) dropwise and with stirring while maintaining the mixture in the ice-water bath. 11.8 grams of lauroyl chloride and 50 cc. of said sodium hydroxide solution were then added simultaneously, dropwise and with stirring and cooling. The total amount of lauroyl chloride added was 21.8 grams (0.1 mol). The total time of the reaction was 17 minutes, the temperature rising to 15.5 degrees C. The reaction mixture comprised a slightly viscous, translucent solution, just neutral to litmus.

(b) 100 grams of the solution of part (a) hereof were admixed with 100 grams of sodium sulphate. The upper layer was removed and dissolved in 100 cc. of isopropyl alcohol. The precipitated inorganic salts were then filtered off and the filtrate was evaporated on a hot water bath, with the aid of a moving stream of air, to remove the isopropyl alcohol. The residue was a light straw colored liquid when hot which became quite viscous when cooled and finally crystallized to a soft grainy consistency. In a Draves test, using 0.1% of the reaction product in tap water, the wetting-out time was 16 seconds and still less in distilled water.

Example II 21 grams of diethanolamine (0.2 mol) were dissolved in 260 cc. of distilled water at 26 degrees C. and 21.8 grams (0.1 mol) of lauroyl chloride were added, dropwise and with stirring, the temperature rising to 37 degrees C. 300 grams of a semi-viscous, cloudy dispersion were produced containing about 9.5% of the desired reaction product. The said reaction product was treated as described in part (b) of Example I to recover it from its dispersion. In the Draves test, 0.1% of the reaction product wetted out in 17 seconds using tap water and in still less time using distilled water. It also had excellent color.

Example III 14 grams of di-isopropanolamine were dissolved in 325 cc. of water and 21.7 grams of lauroyl chloride were added, dropwise and with stirring, and, simultaneously therewith, a solution of 4 grams of sodium hydroxide in 50 cc. of water were added dropwise and with stirring, the reaction mixture being maintained just alkaline to phenolphthalein. The temperature rose from 22 degrees C. to 30 degrees C. during the reaction.

Example IV

To a solution of 110 grams of diethanolamine in 1360 grams of water (approximately half of which was in the form of ice), 130 grams of myristoyl chloride were added, dropwise and with stirring over a period of 10 minutes, the temperature of the reaction mixture rising to about 10 degrees C. The reaction mixture was washed three times with water and then salted out with sodium chloride, a small amount of isopropyl alcohol being used to assist in breaking the emulsion. It was then dried at 140 degrees C. in an atmosphere of carbon dioxide. The reaction mixture obtained comprised a pale amber liquid when hot which, on cooling to room temperature, became a paste-like solid.

Example V 11 grams of 2-amino-2-ethyl-1,3-propanediol

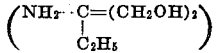

were dissolved in 260 cc. of distilled water at 5 degrees C. and there were then added thereto, slowly and with stirring, 10.9 grams of lauroyl chloride, and, simultaneously therewith, 4 grams of sodium hydroxide dissolved in 60 cc. of water were added dropwise. The additions took place over a period of about 15 minutes, the temperature being maintained at from about 5 degrees C. to about 10 degrees C. by means of an ice water bath. The reaction mixture was then warmed to 50 degrees C., an oily layer separating at the top. The water was then evacuated from the oily layer. The reaction product was a light amber oily material when warm.

In Examples I, III and V, sodium hydroxide was used to neutralize the hydrochloric acid which formed in the reaction. In Examples II and IV, the hydrochloric acid which formed during the reaction was neutralized by the excess of hydroxy-alkyl amine employed, approximately half of the amount of hydroxy-alkyl amine employed being utilized for the purpose of neutralizing the hydrochloric acid.

The Draves test, referred to in Examples I and II hereinabove, comprises suspending a skein of unscoured cotton of predetermined character and weight in a cylinder of water, a small weight attached to a string being affixed to the bottom of said skein. The length of time required for the skein to sink is taken as a measure of the potency of the particular wetting-out agent or agents which have been previously dissolved or dispersed in the water in the cylinder, the shorter the length of time the more potent the wetting-out effect.

The hydroxy-alkyl amines which I employ in accordance with my present invention are characterized by the presence of at least one esterifiable hydroxy group. Of special importance are those hydroxy-alkyl amines which contain at least one esterifiable hydroxy group and at least one nitrogen atom to which hydrogen is directly attached. In other words, my invention is especially important where the hydroxy-alkyl amines are primary or secondary amines or, expressed otherwise, non-tertiary amines, and I make particular claim thereto. I do not, however, exclude the use of hydroxy-alkyl tertiary amines from the broader aspects of my invention. The hydroxy-alkyl amines which I utilize in accordance with my invention are free of other polar groups such as sulphonic, sulphate, phosphate, carboxyl and like groups and it will be understood that, wherever I use the term hydroxy-alkyl amine in the claims, the said term is used in the limited sense here indicated. The presence of such other polar groups adversely affects the reaction products of the present invention for at least many of the purposes for which they are designed to be used.

Among the hydroxy-alkyl amines which may be used in the practice of my invention are, for example, symmetrical, unsymmetrical, normal and iso-derivatives, such as monoethanolamine, diethanolamine, triethanolamine, monopropanolamine, dipropanolamine, tripropanolamine, tri-isopropanolamine, monobutanolamine, mono-isobutanolamine, monopentanolamine, dibutanolamine, tri-butanolamine, mono- and di-pentanolamine, mono- and di-hexanolamine, mono- and di-octanolamine, mono- and di-decylolamine, mono-laurylolamine, trilaurylolamine, mono-hexa-decylolamine, mono-octadecylolamine, monoethyl ethanolamine, diethylaminoethanol, monobutyl ethanolamine; arylolamines and cyclic hydroxy amines such as cyclohexyl ethanolamine, N-cyclohexyl butanolamines, ethanolaniline, ethyl phenyl ethanolamine, phenyl diethanolamine, phenylethanolamine, p-amino phenol,

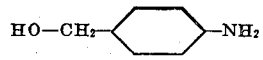

monoethyl diethanolamine, 2-methylamino-propandiol-1,3; 1-phenyl-amino-propan-diol-2,3; 1-hydroxy-ethylamino-2, methoxy-propan-ol-3; 2-N-methylamino-propan-diol-1,3; monoethanol monopropanolamine, monoethanol monobutanolamine; alkylol polyamines such alkylol derivatives of ethylene diamine, diethylene triamine, and tri-ethylene tetra-amine as, for example, hydroxy, ethyl ethylene diamine; diglycerol monoamine, diglycerol di-amine; hydroxy-alkyl amines derived from other polyhydric alcohols, including glycols, sugars and sugar alcohols such as ethylene glycol, diethylene glycol, dextrose, sucrose, sorbitol, mannitol and dulcitol:

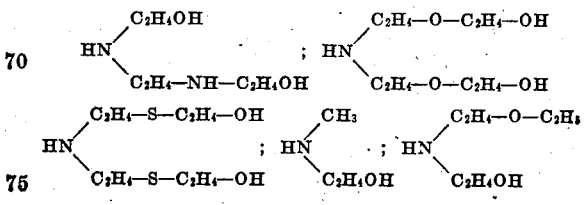

and the like; 1-amino-2,3-propanediol, 2-amino-1,3-propanediol; 2-amino-2-methyl-1,3-propanediol; trimethylol amino methane; 2-amino-2-n-propyl-1,3-propanediol; 2-amino - 2 - isopropyl-1,3-propanediol; 2-amino-2-methyl-1,4-butanediol; 2-amino-2-methyl - 1,5 - pentanediol; 2-amino - 2 - ethyl-1,3-propanediol; 2 - amino-2-ethylol-1,3-propanediol; 2-amino-2-methyl-1,6-hexanediol; 1-amino-1,1-dimethyl ethanol; trimethylol amino-methyl methane; trimethylol amino-methylol methane. The glycerol monoamines and the related hydroxy-alkyl amines, such as various of those disclosed hereinabove, may be prepared by various procedures and in different ways. Many of them are conveniently produced by nitrating paraffin hydrocarbons, substituting methylol groups for hydrogen on the carbons to which the nitro groups are attached, and then reducing the nitro groups to amine groups. Polymerized hydroxy-alkyl amines prepared, for example, by polymerizing monoethanolamine, diethanolamine, triethanolamine, or mixtures thereof, or other hydroxy-alkyl amines such as those mentioned hereinabove, particularly in the presence of a catalyst such as sodium hydroxide or the like, may also be employed. The preparation of polymerized hydroxy-alkyl amines is disclosed, for example, in United States Patent No. 2,178,173. Because of commercial or other considerations, monoethanolamine and diethanolamine are especially desirable. It will be understood that the hydroxy-alkyl amines may be utilized in pure, impure or commercial form.

The carboxylic acid acyl halides which are utilized in accordance with my present invention may also be selected from a large group and may be derived from straight chain and branched chain, saturated and unsaturated, carboxylic, aliphatic (including cycloaliphatic), fatty, aromatic, hydroaromatic, and araliphatic acids including butyric acid, caproic acid, pimelic acid, enanthic acid, caprylic acid, pelargonic acid, capric acid, sebacic acid, behenic acid, arachidic acid, cerotic acid, erucic acid, melissic acid, stearic acid, oleic acid, ricinoleic acid, ricinelaidic acid, ricinostearolic acid, linoleic acid, linolenic acid, lauric acid, myristic acid, palmitic acid, mixtures of any two or more of the above-mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, and other fish oils, partially or completely hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; acids such as i-hydroxy-stearic acid, dihydroxypalmitic acid, di-hydroxy-stearic acid, dihydroxybehenic acid, alpha - hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived, by oxidation and other methods, from paraffin wax, petroleum and similar hydrocarbons; resinic and hydroaromatic acids such as hexahydrobenzoic acid, naphthenic acid and abietic acid, araliphatic and aromatic acids such as phthalic acid, benzoic acid, naphthoic acid, and the like. It will be understood that the acyl halides of mixtures of any two or more of said acids may be employed. Of particular utility are the acyl chlorides of the unsubstituted fatty acids containing from eight to eighteen carbon atoms.

I prefer particularly to carry out the reaction between the hydroxy-alkyl amine and the carboxylic acid acyl chloride or the like in dilute aqueous solutions, preferably of the order of 2.5% to 15% solutions. However, substantially higher concentrations may be utilized as, for example, of the order of 50% or even somewhat more. For best results, moreover, the reaction between the aqueous solution of hydroxy-alkyl amine and the carboxylic acid acyl chloride or the like should be carried out at low temperatures, preferably of the order of 10 degrees C. to 20 degrees C. or less, and ordinarily not much higher than 40 degrees C.

For neutralizing the halogen acid which forms during the reaction, I may employ any suitable alkali as, for example, sodium hydroxide, potassium hydroxide, sodium bicarbonate, sodium carbonate, magnesium hydroxide, organic amines such as diethanolamine, triethanolamine, tripropanolamines, and the like.

The reaction products possess detergent and surface modifying properties and may be utilized for the purposes for which such agents are commonly used as described, for example, in United States Patents Nos. 2,161,937 and 2,238,929.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue; vegetable, animal, fish and mineral oils; solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates, as, for example, lauryl sodium tetraphosphate, octyl sodium sulphate, oleyl sodium sulphate, and the like; higher fatty acid partial esters of aliphatic polyhydroxy substances such as monoglycerides, diglycerides and partial esters of polyglycerols, for example, mono-caprylin, mono-laurin, mono-olein, di-olein, oleic and stearic acid mono-esters of polyglycerols; higher fatty acid mono-esters of glycols, such as lauric acid mono-ester of diethylene glycol; higher molecular weight sulphonic acid derivatives such as cetyl sodium sulphonate and lauryl sodium sulphonate; sulpho-carboxylic acid esters of higher molecular weight alcohols such as lauryl sodium sulphoacetate, dioctyl sodium sulpho-succinate, dilauryl potassium sulpho-glutarate, lauryl mono-ethanolamine sulphoacetate, and the like; sulphuric and sulphonic derivatives of condensation products of alkylolamines and higher fatty acids; phosphoric, pyrophosphoric and tetraphosphoric acid esters of higher molecular weight alcohols; Turkey-red oils; compounds of the type of isopropyl naphthalene sodium sulphonate, and other classes of wetting agents.

The present application is a continuation-in-part of my prior application, Serial No. 405,220, filed August 2, 1941.

While the invention has been described in detail, it is to be understood that the scope thereof is not to be limited other than is set forth in the claims.

What I claim as new and desire to protect by Letters Patent of the United States is:

1. A method of preparing reaction products having good color and good wetting-out properties which comprises providing a dilute aqueous solution of an hydroxy-alkyl amine, maintaining said solution at low temperatures, adding thereto a carboxylic acid acyl halide while preventing a rise in temperature substantially beyond 40 degrees C. and neutralizing the hydrohalic acid which forms during the reaction.

2. A method of preparing reaction products having good color and good wetting-out properties which comprises providing a dilute aqueous solution of an hydroxy-alkyl amine, maintaining said solution at low temperatures, adding thereto slowly a higher molecular weight carboxylic acid acyl chloride while preventing a rise in temperature substantially beyond 40 degrees C. and neutralizing the hydrochloric acid which forms during the reaction, and then recovering the resulting reaction product from the aqueous solution.

3. A method of preparing reaction products having good color and good wetting-out properties which comprises providing a dilute aqueous solution of an hydroxy-alkyl amine, maintaining said solution at low temperatures, adding thereto slowly lauroyl chloride while preventing a rise in temperature substantially beyond 40 degrees C. and neutralizing the hydrochloric acid which forms during the reaction, the molal ratio of the hydroxy-alkyl amine to the lauric acid present in the reaction product being of the order of one to one, and then recovering the resulting reaction product from the aqueous solution.

4. A method of preparing reaction products having good color and good wetting-out properties which comprises providing an aqueous solution of about 2.5% to 15% of an hydroxy-alkyl non-tertiary amine, maintaining said solution at temperatures not substantially above room temperature, adding thereto slowly a fatty acid acyl chloride while preventing a rise in temperature substantially beyond 40 degrees C. and neutralizing the hydrochloric acid which forms during the reaction, and then recovering the resulting reaction product from the aqueous solution.

5. A method of preparing reaction products having good color and good wetting-out properties which comprises providing an aqueous solution of about 2.5% to 15% of an hydroxy-alkyl non-tertiary amine, maintaining said solution at low temperatures, adding thereto relatively slowly lauroyl chloride while preventing a rise in temperature substantially beyond 40 degrees C. and neutralizing the hydrochloric acid which forms during the reaction, the molal ratio of the hydroxy-alkyl non-tertiary amine to the lauric acid present in the reaction product being of the order of one to one, and then recovering the resulting reaction product from the aqueous solution.

6. A method of preparing reaction products having good color and good wetting-out properties which comprises providing an aqueous solution of about 2.5% to 15% of an hydroxy-alkyl secondary amine, maintaining said solution at temperatures not substantially above room temperature, adding thereto slowly a fatty acid acyl chloride having from 8 to 18 carbon atoms while preventing a rise in temperature substantially beyond 40 degrees C. and neutralizing the hydrochloric acid which forms during the reaction, and then recovering the resulting reaction product from the aqueous solution.

7. A method of preparing reaction products having good color and good wetting-out properties which comprises providing a dilute aqueous solution of 2-amino-2-alkyl-1,3-propanediol, maintaining said solution at low temperatures, adding thereto slowly a fatty acid acyl chloride while preventing a rise in temperature substantially beyond 40 degrees C. and neutralizing the hydrochloric acid which forms during the reaction, and then recovering the resulting reaction product from the aqueous solution.

8. A method of preparing reaction products having good color and good wetting-out properties which comprises providing an aqueous solution of an hydroxy-alkyl amine, maintaining said solution at low temperatures, adding thereto a carboxylic acid acyl chloride while preventing a rise in temperature substantially beyond 40 degrees C. and neutralizing the hydrochloric acid which forms during the reaction.

9. A method of preparing reaction products having good color and good wetting-out properties which comprises providing an aqueous solution of an hydroxy-alkyl non-tertiary amine, maintaining said solution at low temperatures, adding thereto slowly a higher molecular weight fatty acid acyl chloride while preventing a rise in temperature substantially beyond 40 degrees C. and neutralizing the hydrochloric acid which forms during the reaction, and then recovering the resulting reaction product from the aqueous solution.

10. A method of preparing reaction products having exceptional wetting-out properties which comprises providing an aqueous solution of diethanolamine, maintaining said solution at low temperatures, adding thereto acyl halides of a mixture of fatty acids at least the predominating constituent of which is lauric acid while preventing a rise in temperature substantially beyond 40 degrees C. and neutralizing the hydrohalic acid which forms during the reaction.

11. A method of preparing reaction products having exceptional wetting-out properties which comprises providing a dilute aqueous solution of diethanolamine, maintaining said solution at low temperatures, adding thereto relatively slowly lauroyl chloride while preventing a rise in temperature substantially beyond 40 degrees C. and neutralizing the hydrochloric acid which forms during the reaction, and then recovering the resulting reaction product from the aqueous solution.

12. A method of preparing reaction products having exceptional wetting-out properties which comprises providing a dilute aqueous solution of diethanolamine, maintaining said solution at low temperatures, adding thereto relatively slowly lauroyl chloride while preventing a rise in temperature substantially beyond 40 degrees C. and neutralizing the hydrochloric acid which forms during the reaction, the molal ratio of the diethanolamine to the lauric acid present in the reaction product being of the order of one to one, and then recovering the resulting reaction product from the aqueous solution.

13. A method of preparing reaction products having exceptional wetting-out properties which comprises providing an aqueous solution of about 2.5% to 15% of diethanolamine, maintaining said solution at temperatures not substantially above room temperature, adding thereto relatively slowly lauroyl chloride while preventing a rise in temperature substantially beyond 40 degrees C. and neutralizing the hydrochloric acid which forms during the reaction, and then recovering the resulting reaction product from the aqueous solution.

14. A method of preparing reaction products having exceptional wetting-out properties which comprises providing an aqueous solution of about 2.5% to 15% of diethanolamine, maintaining said solution at relatively low temperatures, adding thereto slowly lauroyl chloride while preventing a rise in temperature substantially beyond 40 degrees C. and neutralizing the hydrochloric acid which forms during the reaction, the molal ratio of the diethanolamine to the lauric acid present in the reaction products being of the order of one to one, and then recovering the resulting reaction product from the aqueous solution.

MORRIS KATZMAN.